United States Patent [19]
Fern et al.

[11] 3,832,558
[45] Aug. 27, 1974

[54] AUTOMATIC WAVELENGTH TRACKING SYSTEM

[75] Inventors: Robert E. Fern, Yonkers, N.Y.;
Aare Onton, Korntal, Germany

[73] Assignee: International Business Machines Corporation, Armonk, N.Y.

[22] Filed: Mar. 20, 1973

[21] Appl. No.: 343,089

[52] U.S. Cl. ................................. 250/461, 356/85
[51] Int. Cl. ........................................ G01n 21/38
[58] Field of Search .......... 250/339, 340, 458, 459, 250/461, 483; 356/85

[56] References Cited
UNITED STATES PATENTS

| | | | |
|---|---|---|---|
| 2,971,429 | 2/1961 | Howerton | 250/339 X |
| 3,449,571 | 6/1969 | Hoerman et al. | 250/339 X |
| 3,719,423 | 3/1973 | Leheny et al. | 356/85 X |

*Primary Examiner*—Archie R. Borchelt
*Attorney, Agent, or Firm*—Sughrue, Rothwell, Mion, Zinn & Macpeak

[57] ABSTRACT

A method and apparatus for determining the characteristics of a luminescent material using a monochromator to detect the intensity of a light emitted by the material at a single major spectral line as the material is scanned. The wavelength of a monochromator is adjusted such that the intensity being measured is the peak intensity. The fact that the intensity is the peak intensity is determined by taking the derivative of the intensity with respect to wavelength as the wavelength of the monochromator is modulated by a wavelength wobbler. The intensity is at its peak when the derivative equals zero. The derivative signal is applied to a servo loop which controls the wavelength of the monochromator and varies the wavelength such that the derivative is maintained equal to zero. This technique may be used to determine the atomic proportions of material having intensity and/or wavelength related to its composition, to define areas of a material having particular characteristics, to evaluate a piece of material, or to determine the line shape of the spectral curve at a point on the material.

18 Claims, 5 Drawing Figures

AUTOMATIC WAVELENGTH TRACKING SYSTEM

BACKGROUND OF THE INVENTION

1. Field of the Invention

This invention relates to a method and apparatus for determining the characteristics of a luminescent material and more particularly to a method and apparatus for providing a continuous measurement of the peak intensity and the wavelength at which the peak intensity occurs as a function of position on the material.

2. Description of the Prior Art

The prior art systems for determining the characteristics of a luminescent material trace out the photoluminescence spectrum for each point on the wafer. The area under the spectral curve gives the visible luminescence efficiency while the wavelength at the peak may be used to obtain the alloy composition. Measurements of this type are obviously very time consuming and give only a limited picture of the properties of the entire piece of material since the analysis is conducted in a point-by-point manner. Systems of this type therefore are unable to give rapid efficient analysis of luminescent materials.

The general technique of measuring properties of a material using a modulated monochromator is old as evidenced by U.S. Pat. No. 3,565,567. Furthermore, devices using the derivative of a spectral signal are also known in the art as evidenced by U.S. Pat. No. 3,578,866. The derivative signal is used to determine points of peak intensity in the spectrum.

SUMMARY OF THE INVENTION

It is a primary object of this invention to provide a method and apparatus for quickly and easily determining the characteristics of a luminescent material.

It is another object of this invention to provide a method and apparatus for continuously measuring the peak intensity and the wavelength at which the peak intensity occurs as a function of position on a piece of luminescent material.

It is still another object of this invention to determine the derivative of intensity with respect to wavelength for a luminescent material and for maintaining the derivative equal to zero.

It is still a further object of this invention to provide a feedback loop which detects the derivative of intensity with respect to wavelength and then adjusts the wavelength at which the intensity is being measured such that the derivative is constantly maintained at zero.

This invention provides a method and apparatus for continuously determining the peak intensity and the wavelength at which the peak intensity occurs for a luminescent material such as an LED wafer. The radiation emitted by the wafer as the wafer is scanned is measured by a monochromator which is set to a particular wavelength of detection. The wavelength of detection is then modulated by a wavelength wobbler over a small portion of the spectrum to get an output from the monochromator which is proportional to the derivative of the intensity with respect to wavelength. The derivative signal is applied through a servo loop back to the wavelength adjusting mechanism of the monochromator in order to readjust the wavelength of detection to another particular wavelength, if necessary, so that the derivative is maintained at zero during the scan. A zero derivative is indicative of peak intensity at the particular wavelength. The wavelength setting of the monochromator is continually monitored and in this manner the wavelength at which the peak intensity occurs is constantly being monitored since the monochromator is always adjusted to the particular wavelength to give peak intensity. The peak intensity itself is also measured. The peak intensity and the wavelength at which it occurs are recorded as a function of position on the wafer and thus the characteristics of peak intensity and wavelength can quickly and easily be determined for the wafer.

The atomic proportions of a luminescent material may be determined by the above technique if the material is of the type having its composition related to luminescent intensity and/or wavelength. The material is scanned and the intensity and/or wavelength outputs may be substituted into the composition relationship to give an output indicative of the atomic proportions.

If a piece of luminescent material has areas of different characteristics, such as doped and undoped areas, the areas may be defined by using the above technique with the peak intensity and wavelength being recorded as a function of position. There will be sharp changes in the peak intensity and wavelength as the scan passes from one area to another.

Parameters, which are related to intensity and wavelength, for determining the quality of a luminescent material may be developed and the technique described above may be used to rapidly determine the parameters and thus assess the quality of the material.

The technique also has application in determining the line shape of the spectral curve at a point on a luminescent material. The line shape may be expressed in terms of skewness of the peak and width of the line.

DESCRIPTION OF THE PREFERRED EMBODIMENT

Figure 1:
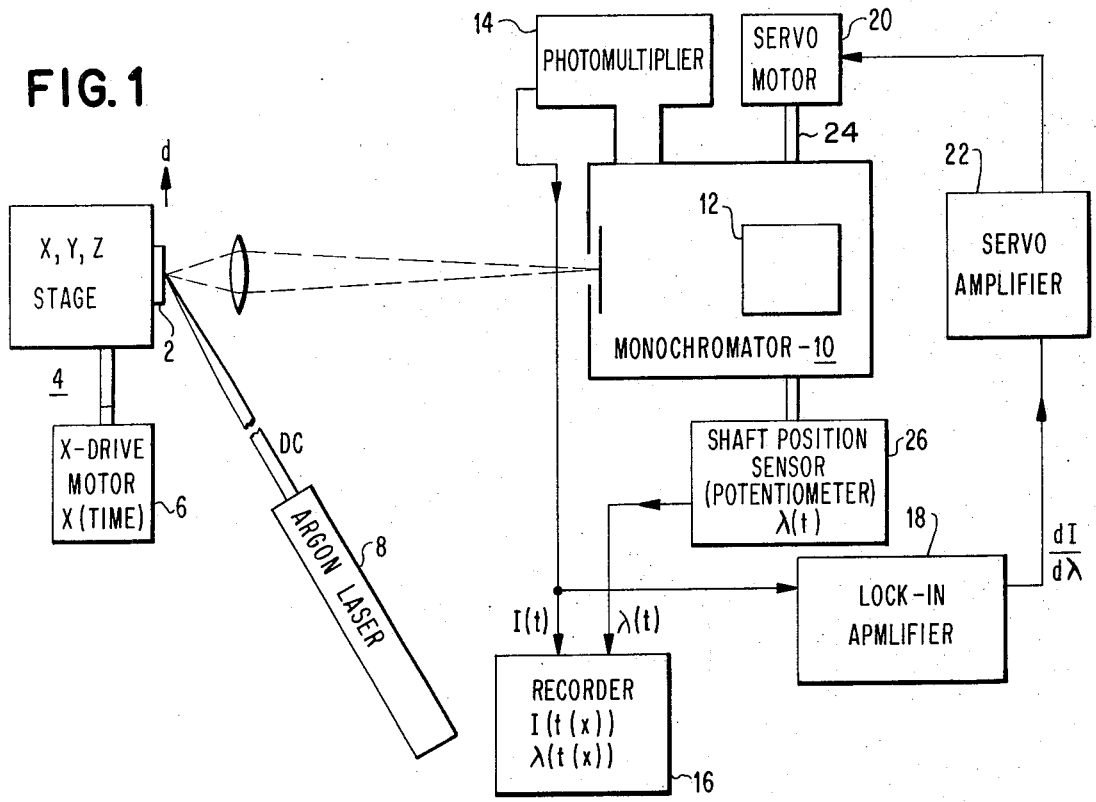
FIG. 1 is a block diagram of the apparatus of the present invention.

Referring to FIG. 1, a luminescent material such as an LED wafer 2, which is to be analyzed, is placed in a test stand 4. The test stand includes a drive motor 6 which moves the wafer along one of its dimensions. The wafer is excited byy a laser 8 and the radiation emitted by the wafer is detected by a monochromator 10 such as a Perkin-Elmer PE-98. The monochromator detects the intensity of the light emitted by the wafer at a particular wavelength to which it is set. The wavelength of detection of the monochromator is modulated by a wavelength wobbler 12, such as American Time Products Inc. L-45 Optical Scanner, included within the monochromator. Due to wavelength modulation or wobbling, the output of the monochromator includes two signals, the first indicative of the intensity of the light emitted by the wafer at the wavelength of the monochromator, and the second which is proportional to the derivative of the intensity with respect to wavelength.

The intensity signal and its derivative which are the outputs of the monochromator are derived as follows. The intensity of a single spectral peak can be expressed in the form of a rapidly converging polynomial such as $$I = a_1 + a_2 (\lambda - \lambda_o) + a_3 (\lambda - \lambda_o)^2 + a_4 (\lambda - \lambda_o)^3 + \quad (1)$$

where
$I$ = intensity
$\lambda_o$ = wavelength at the peak $$dI/d\lambda = 0 + a_2 + 2a_3 (\lambda - \lambda_o) + 3a_4 (\lambda - \lambda_o)^2 + \quad (2)$$

Using a wavelength wobbler to change the wavelength by a small amount $\Delta\lambda$:

$$\lambda = \lambda_o + \Delta\lambda \sin \omega t \quad (3)$$

where $\omega$ = frequency of the wobbler.
Substituting (3) into (1):

$$I = a_1 + a_2 \Delta\lambda \sin \omega t + (1/2)a_3 (\Delta\lambda)^2 (1 - \cos 2\omega t) + \quad (4)$$

and for small $(\lambda - \lambda_o$ or $\Delta\lambda)$:

$$I = a_1 \quad (5)$$

$$dI/d\lambda = a_2. \quad (6)$$

It can be seen that if the output of the monochromator is $I$, as expressed in equation (4), it contains the terms $a_1$ and $a_2\Delta\lambda \sin\omega t$. The $a_1$ term may be considered the DC output and the $a_2$ the AC output. As shown in equation (5) the DC output $a_1$ is proportional to $I$, and as shown in equation (6) the AC output $a_2\Delta\lambda$ is proportional to $dI/d\lambda$. The intensity and intensity derivatives are thus readily obtainable by detecting the DC and AC outputs of the monochromator, respectively.

These AC and DC signals corresponding to the derivative of intensity and intensity are detected by photomultiplier 14. The DC signal is applied to recorder 16 which records the intensity as a function of the location or position of the point at which the beam of the laser strikes and excites the wafer. The AC signal is applied to lock-in amplifier 18 which is a narrow band amplifier such as Princeton Applied Research JB-5. The output of the amplifier which is proportional to $a_2\Delta\lambda$, the derivative, is applied to servomotor 20 through servo amplifier 22. The servo motor 20 is connected to the monochromator wavelength setting drive mechanism 24 which adjusts the wavelength of detection to which the monochromator is set. The shaft position of the wavelength setting drive mechanism 24 is sensed by shaft position sensor 26, the output of which is a function of the wavelength of detection of the monochromator, and is applied to recorder 16 which records the wavelength of detection of the monochromator as a function of the position on the wafer.

The spectral curve at a particular point on the wafer has a waveshape which rises from a zero intensity and increases to a peak intensity at the main spectral line and then decreases as the wavelength goes above the main spectral line. The derivative of the intensity with respect to the wavelength is zero at the peak of the curve. This phenomenon is used to continuously maintain the wavelength of detection of the monochromator at the peak intensity of the wafer at any point on the wafer as the wafer is being scanned. The servo loop in the system is arranged such that when the derivative is positive indicating that the wavelength of detection of the monochromator is below the wavelength of peak intensity, the servo motor drives the wavelength setting drive mechanism in order to increase the wavelength of detection to the peak intensity. When the wavelength of detection goes above the wavelength corresponding to peak intensity, a negative derivative is produced and this is used to drive the servo motor in the opposite direction, thereby decreasing the wavelength of detection of the monochromator until it returns to the wavelength corresponding to peak intensity. In this manner, the wavelength of detection is constantly maintained at the wavelength corresponding to peak intensity and the intensity output from the photomultiplier is therefore the peak intensity of the wafer at continuous points along the scan of the wafer.

The apparatus of FIG. 1 can be used to determine the atomic composition or elemental proportions of a luminescent material such as an LED wafer from its luminescent intensity and/or wavelength of the emitted light as a function of position. The material is scanned by the apparatus described in FIG. 1 which produces outputs of peak intensity as a function of position and wavelength, at which the peak intensity occurs, as a function of position. These outputs are substituted into known relationships, as reported for example, in Journal of Applied Physics 42, (1971) by A. Onton, N. R. Lorenz and W. Reuter for the $In_{1-x}Ga_xP$ alloy system (other alloy systems are also reported in the open literature), preferably by the equipment itself, to produce outputs equal to the atomic proportion of elements of the material as a function of position. Thus, the overall composition of the material and variations therein may be easily and rapidly determined.

Figure 2:
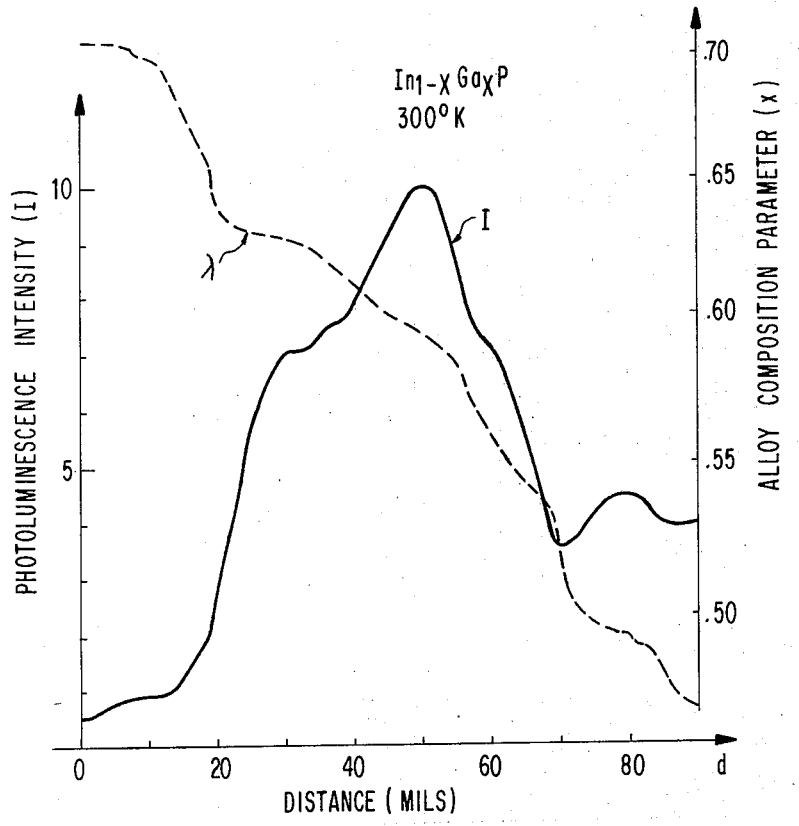
FIG. 2 are curves developed for determining the atomic proportions of the elements comprising the alloy composition of a wafer.

Referring to FIG. 2, curve $I$ represents the peak intensity as a function of the distance $d$ from one of the edges of an indium gallium phosphide wafer having the composition $In_{1-x}Ga_xP$, wherein $x$ represents the atomic proportion of gallium in the In Ga P wafer composition in this example. The curve $\lambda$, representing the wavelength at which the peak intensity occurs, can be converted to the atomic proportion $x$ using known relationships. From the atomic proportion of $x$ the overall elemental composition of the In Ga P wafer is determined. Using the apparatus shown in FIG. 1 the wafer under test is placed in the stand and then scanned in the $d$ direction. The curves in FIG. 2 are the signals continuously recorded by recorder 16. In this particular LED wafer, the elemental composition varied in the $d$ direction and the intensity also varied.

As can be seen from the above the elemental composition of an $In_{1-x}Ga_xP$ wafer can be determined. The method generally can be used for any system ternary alloys having the general formula $M_{1-x}N_xW$ or $MV_{1-x}W_x$ wherein M and N are elements of Group IIIA of the periodic table such as Al, Ga, or In and V and W are elements of Group VA of the periodic table such as P, As, or Sb. The method is also suitable for ternary Group III – Group VI systems and Group I – VII systems. For the Group III – Group V systems the method is useful in the direct gap range of alloy compositions. Basically, the method is suitable for any alloy composition which exhibits band gap luminescence and the alloy composition is given by a single parameter, such as $x$ in the specific example set forth above.

Figure 3:
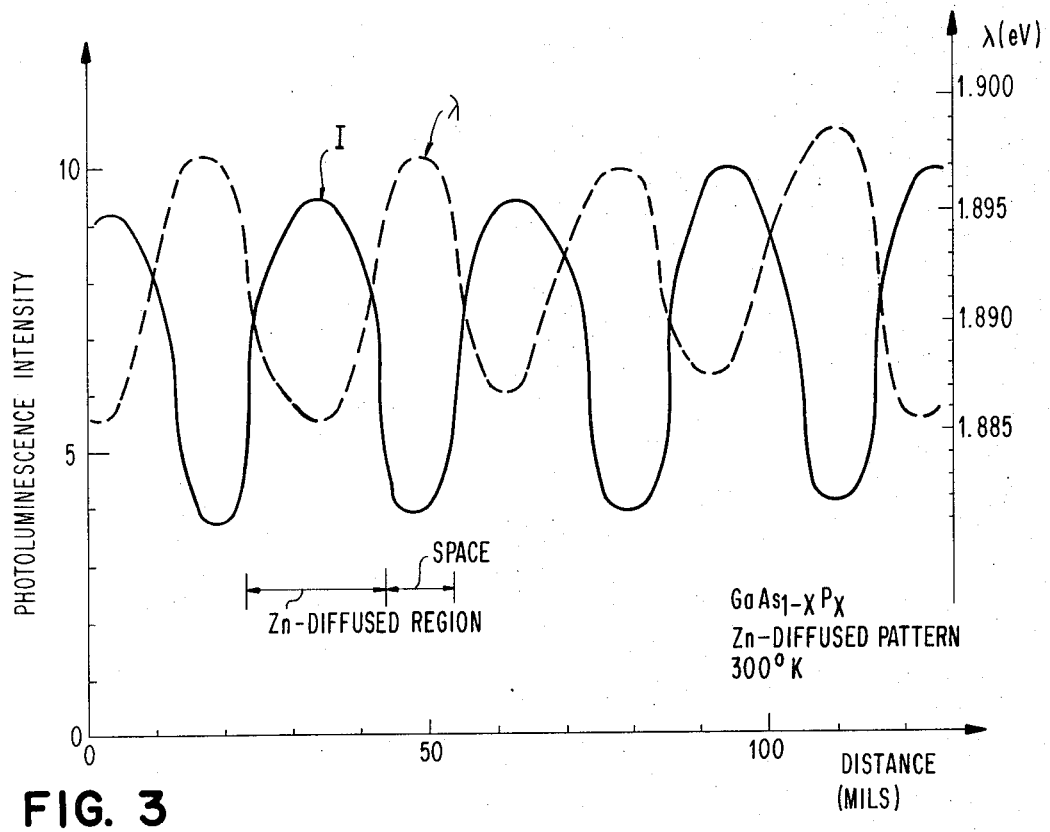
FIG. 3 are curves developed for determining the location of diffused regions in an LED wafer.

The apparatus of FIG. 1 can also be used to locate and map out areas of a luminescent material having characteristics different from other areas if the characteristics are related to luminescent intensity and/or wavelength. For instance if an area of the material is doped differently than the remainder the differently doped area may be located by plotting the intensity and/or wavelength as a function of position. This technique is illustrated by referring to FIG. 3 which represents the peak intensity and wavelength parameters derived from an LED wafer having diffused zinc regions using the apparatus of FIG. 1. The I curve is peak intensity as a function of position while the λ curve is wavelength at peak intensity as a function of position. In the diffused regions, the intensity is high and the wavelength is low, while in the spaces between the diffused regions, the wavelength is high and the intensity is low. The location of the diffused and non-diffused areas are readily apparent by viewing FIG. 3.

In evaluating a luminescent material such as an LED wafer, a wide variety of parameters which are related to intensity and wavelength can be chosen to assess the quality of the material. The choice of parameter will of course depend on the purpose of the evaluation and thus would be made by the person conducting the evaluation. Once the parameters have been selected, the apparatus of FIG. 1 can be used to quickly and easily obtain the parameter selected by the operator. As an example, a first set of parameters could be selected which are related to the wavelength of emissions. The parameters of this set could include the average wavelength of peak emission; a number related to the standard deviation from the average of the wavelength of peak emission for the whole or any portion of the wafer; and if the wafer is analyzed on a point-by-point basis even though the number of points may be large, the number of times that the wavelength of peak emission varies from the average wavelength of peak emission by a predetermined amount; or if the wafer is considered to be continuous, the percent of time of the scan of the wafer that the wavelength of peak emission differs from the average wavelength by a predetermined amount.

A second set of parameters is related to the intensity and includes an average or reference peak intensity; a number related to the standard deviation of the intensity for all of the points on the wafer from the average or reference intensity; and when considering the wafer as a number of points the number of times that the intensity differs by more than a predetermined amount from the average or reference intensity; and when considering the wafer as continuous the percent of time that the scan differs by more than the predetermined amount from the average or reference intensity.

Using the apparatus shown in FIG. 1, the average peak intensity and the wavelength of peak intensity are measured with the servo loop on. By having the servo loop on, the detection of peak intensity is assured. The average wavelength of peak intensity over the whole wafer is measured by using light from the entire wafer and focusing the light to a small spot on a diffuser plate which is then focused on the entrance slit of the monochromator. The average or reference intensity may be measured at any spot on the wafer, but the center is the most logical. Once the average wavelength and average or reference peak intensity have been determined, the servo loop is then turned off and the sample is scanned with the monochromator set to the average wavelength and the wavelength wobbler operating. Since the servo loop is not on, the intensity is not necessarily the peak intensity and therefore the derivative of the intensity is not necessarily zero. The AC portion of the intensity signal and the derivative signal produced during the scan of the wafer are detected by the photomultiplier and integrated with the derivative signal first being rectified. The rectified and integrated signals are used to obtain the numbers related to the standard deviation of the wavelength and intensity.

The standard deviation is defined as $$\sigma = \sqrt{(I - I_o)^2}$$

where $I_o$ = reference intensity. This is actually the function produced by an AC rms voltmeter. Thus, for example, in the simplest possible case (when the scan over the entire sample can be made very rapidly with a laser beam; the speed being limited mostly by luminescence response times) the intensity and derivative signals can be measured with an AC voltmeter. The AC voltmeter output will then be directly proportional to the standard deviations of the intensity and derivative with respect to wavelength. In any specific case a proportionality between the standard deviation of the wavelength derivative and the wavelength deviation of the peak from the average wavelength can be easily calculated. The standard deviation of intensity may be read directly from the voltmeter.

By using gating and counting circuitry on the intensity and derivative signals, it is possible to obtain directly numerical data on how much of the wafer or how many times on the wafer the intensity or wavelength deviated from the specified average intensity or wavelength by a predetermined amount.

The measurement described above can be made relatively fast and thus a large number of wafers could be evaluated in a short period of time. The operator doing the testing would have to decide what he considered as acceptable criteria based on the standard deviation and the number of times and percent of scan that the wafer differs more than a predetermined amount from average values to determine if the wafers are acceptable for his purpose. Furthermore, it is readily apparent that any number of other parameters can also be developed and used to evaluate the wafers.

Figure 4A:
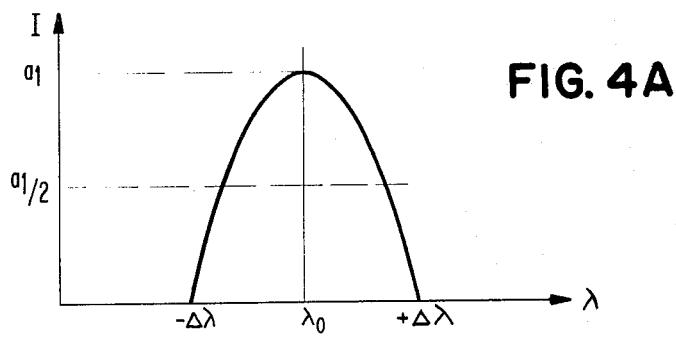
FIGS. 4A and 4B represent ideal and skewed spectral lines which may be analyzed using the present invention.
Figure 4B:
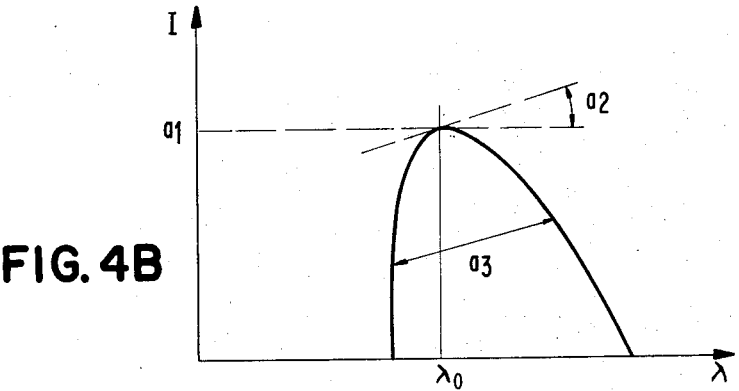

The apparatus of FIG. 1 can also be used to perform a line shape analysis on the wavelength spectrum of a point on a luminescent material. FIGS. 4A and 4B show a typical room temperature photoluminescent peak. It has a peak intensity $I_o$ at wavelength $\lambda_o$. For very small wavelength oscillations from the wavelength wobbler, which are used to obtain the derivative of intensity as used heretofore in the description of the application of the invention, the line width of the emission peak can be assumed to have a parabolic top with no loss in accuracy for finding the wavelength at the peak $\lambda_o$. However, as the wavelength oscillation of the wobbler $\Delta\lambda$ is increased, the servo 0 point will begin to deviate from $\lambda_o$ by an amount this is proportional to the skewness, i.e. the non-parabolicity, of the peak. This fact can be used to measure the skewness of the peak. Referring back to equations (2) and (4) it is apparent that as $\Delta\lambda$ or $(\lambda - \lambda_o)$ increases, $a_1$ becomes the average intensity while $a_2$ becomes the average linear slope within $2\Delta\lambda$ since it is the derivative. Repeating equation (4)

$$I = a_1 + a_2 \Delta\lambda \sin\omega t + (1/2) a_3 (\Delta\lambda)^2 (1 - \cos 2 \omega t) +$$

(4)

if we stop the wobbler and look at the line shape in FIG. 4A for deviations of $\Delta\lambda$ from the peak $$I = a_1 + (1/2) a_3 (\Delta\lambda)^2$$

(7)

FIG. 4A is the ideal parabolic peak at $\lambda_o$ with height of $a_1$. Its half height is $a_1/2$ and occurs for $\Delta\lambda$ solved by substituting $a_1/2$ for $I$ in equation (7):

$$a_1/2 = a_1 + 1/2\ a_3\ (\Delta\lambda)^2{}_{hh}$$

$$-a_1/2 = 1/2\ a_3\ (\Delta\lambda)^2{}_{hh}$$

$$(\Delta\lambda)_{hh} = \sqrt{-a_1/a_3}$$

or for the purpose of measuring half width $$a_3 = -\ a_1/2(\Delta\lambda)^2 hh$$

(8)

where $a_1/2$ is $I_o/2$ and is set arbitrarily for the system. It can be seen then that when measuring the signal at a frequency $2\omega$ [see equation (4)], a signal proportional to $a_3$ is measured which in turn can be related directly to line width by calibration [see equation (8)]. A realistic peak as described by equation (4) will, however not be perfectly parabolic (i.e., $a_2 = 0$). If $a_2$ is not equal to zero then the curve of equation (4) is as shown in FIG. 4B.

Now we still have a curve with height $a_1$ and half-width related to $a_3$ but it is now tilted in the manner shown where the tilt is proportional to the coefficient $a_2$. This is the lowest order polynomial expression for an asymmetric peak.

Of course the linewidth and skewness are not completely independent parameters mathematically. It has been shown, however, that for lineshapes normally encountered $a_2$ (measured at frequency $\omega$) and $a_3$ (measured at frequency $2\omega$) provide useful measurements of skewness and linewidth. Therefore, from equation (4) it is seen that $a_2$ contributes to the skewness of the peak while $a_3$ determines the line width. $a_2$ may therefore be defined as the skewness parameter while $a_3$ is defined as the line width parameter and these two values may be easily determined by the system. For simple line shape, higher order terms are very small and are thus not considered.

The system of FIG. 1 can be used to determine line shape in the following manner. The wavelength servo loop is disconnected. Then the photomultiplier D.C. anode current is brought to a preset value corresponding to $I_o$. A mechanical servo is activated to drive the wavelength amplitude of the wobbler $\Delta\lambda$ up to the point at which the time $1/2\ a_3\ (\Delta\lambda)^2$ of equation (4) reaches a preset value. $a_2$ is then measured at the frequency $\omega$ [see equation (4)] to determine the skewness of the peak. $a_3$, the line width parameter is then equal to $c/\Delta\lambda^2$ where $c$ is a constant for the system determined by the preset value for $1/2\ a_3\ (\Delta\lambda)^2$ in the measurement of $a_2$ and $\Delta\lambda$ can be determined directly from a wafer on the wobbler drive. Therefore, the line width parameter $a_3$ is readily obtainable. The parameter $c$ is arbitrarily selected; however, typical values range from $0.1 I_o$ to $0.2 I_o$.

From the foregoing, it is clear that the apparatus of FIG. 1 has wide application in determining properties of luminescent materials which have characteristics related to wavelength and/or intensity. The apparatus thus provides an easy and rapid technique for determining these parameters.

While the invention has been particularly shown and described with reference to the preferred embodiment thereof, it will be understood by those skilled in the art that various changes in form and details may be made therein without departing from the spirit and scope of the invention.

We claim:

1. A method of determining, for a luminescent material, the peak intensity and wavelength, at which the peak intensity occurs, as a function of position comprising the steps of:
   a. scanning said material in at least one direction;
   b. simultaneously measuring the intensity emitted from said material at a first wavelength of detection;
   c. simultaneously varying the wavelength of detection at which the intensity is measured by a small amount about the first wavelength of detection while continuously measuring the intensity;
   d. simultaneously measuring the derivative of the intensity with respect to wavelength $(dI/d\lambda)$; and
   e. simultaneously readjusting the first wavelength of detection such that $dI/d\lambda = 0$ continuously during the scan whereby said continuous measurement of intensity is locked on the peak intensity at all positions along the scan of the material.

2. The method as set forth in claim 1 further including:
   a. recording the peak intensity as a function of position; and
   b. recording the wavelength, at which peak intensity occurs, as a function of position.

3. The method of claim 1 wherein the intensity of the material includes a DC and AC term and wherein measuring the intensity comprises measuring the DC term and measuring the derivative comprises measuring the AC term.

4. An apparatus for determining the characteristics of a luminescent material comprising:
   a. detecting means for detecting at a first wavelength of detection the intensity of the light emitted by said material and for providing a signal having a first component which is a function of the intensity of said light and a second component which is a function of the derivative of the intensity with respect to wavelength $(dI/d\lambda)$;
   b. wavelength detecting varying means for varying the wavelength of detection at which said detecting means detects the intensity of the light, said wavelength varying means varying the wavelength of detection by small increments about said first wavelength of detection; and c. feedback means coupled to said detecting means, for controlling the first wavelength of detection such that $dI/d\lambda = 0$ whereby the first wavelength of detection is the wavelength of peak intensity of the light emitted by the material.

5. The apparatus of claim 4 further including recorder means for recording the first wavelength of detection and peak intensity as a function of position on the material.

6. The apparatus of claim 4 further including scanning means for continuously scanning the material in at least one direction such that the intensity of light emitted by the material is continuously detected.

7. The apparatus of claim 4 wherein said detecting means comprises:
   a. a monochromator; and
   b. optical detector means.

8. The apparatus of claim 6 wherein said feedback means comprises a servo loop connected between said optical detector and said monochromator wherein the $dI/d\lambda$ output of said optical detector is used to adjust the wavelength of the monochromator such that $dI/d\lambda = 0$.

9. A method of determining the elemental composition of a luminescent material having an elemental composition related to peak luminescent intensity and wavelength of peak luminescent intensity comprising the steps of:
   a. continuously measuring the peak intensity and wavelength as a function of position; and
   b. substituting the measured peak intensity and wavelength into the relationship of composition and peak intensity and wavelength, whereby said atomic proportions are determined as a continuous function of position.

10. A method of determining the elemental composition of a luminescent material having an elemental composition related to peak luminescent intensity and wavelength of peak luminescent intensity comprising the steps of:
   a. scanning said material in at least one direction;
   b. simultaneously measuring the intensity emitted from said material at a first wavelength of detection;
   c. simultaneously varying the wavelength of detection at which the intensity is measured by a small amount about the first wavelength of detection while continuously measuring the intensity;
   d. simultaneously measuring the derivative of the intensity with respect to wavelength $(dI/d\lambda)$;
   e. simultaneously readjusting the first wavelength of detection such that $dI/d\lambda = 0$ continuously during the scan whereby said continuous measurement of intensity is locked on the peak intensity at all positions along the scan of the material; and
   f. substituting the measured peak intensity and wavelength into the relationship of composition to peak intensity and wavelength, whereby said atomic proportions are determined as a continuous function of position.

11. A method of determining the location of areas on a luminescent material, the areas having characteristics different from other areas, wherein the characteristics are related to peak luminescent intensity and wavelength of peak intensity comprising the steps of:
   a. scanning said material in at least one direction with a measuring apparatus;
   b. continuously measuring the peak intensity and wavelength of said material as a function of position; and
   c. producing an output showing continuous changes in peak intensity and wavelength as a function of position whereby said changes are indicative of the boundaries of said areas having different characteristics.

12. A method of determining the location of areas, on a luminescent material, the areas having characteristics different from other area, wherein the characteristics are related to peak luminescent intensity and wavelength of the peak intensity comprising the steps of:
   a. scanning said material in at least one direction;
   b. simultaneously measuring the intensity emitted from said material at a first wavelength of detection;
   c. simultaneously varying the wavelength of detection at which the intensity is measured by a small amount about the first wavelength of detection while continuously measuring the intensity;
   d. simultaneously measuring the derivative of the intensity with respect to wavelength $(dI/d\lambda)$;
   e. simultaneously readjusting the first wavelength of detection such that $dI/d\lambda = 0$ continuously during the scan whereby said continuous measurement of intensity is locked on the peak intensity at all positions along the scan of the material; and
   f. producing an output showing changes in peak intensity and wavelength as a function of position whereby said changes are indicative of the boundaries of said areas having different characteristics.

13. A method of obtaining parameters for evaluating a luminescent material comprising the steps of:
   a. measuring the average wavelength at which peak intensity occurs for said material;
   b. measuring a reference peak intensity for said material;
   c. scanning said material and continuously measuring the intensity and derivative of intensity with respect to wavelength at said average wavelength;
   d. obtaining a first value related to the standard deviation of the wavelength from the average wavelength;
   e. obtaining a second value related to the standard deviation of the intensity from the reference intensity;
   f. counting the number of times that the wavelength for points on the material differs from said average wavelength by more than a predetermined amount; and
   g. counting the number of times that the intensity for points on the material differs from said reference intensity by more than a predetermined amount.

14. The method of claim 13 wherein the differential intensity and derivative of wavelength are rectified and integrated to obtain said first and second values, respectively.

15. A method of determining parameters related to the spectral line shape of a spectral line of light emitted at a point of a luminescent material comprising the steps of:
   a. determining the peak intensity and wavelength of peak intensity of the emitted light;

b. periodically varying the wavelength of detection of intensity about the wavelength of peak intensity at a frequency $\omega$;

c. changing the amplitude of the double frequency term of the intensity until it reaches a predetermined value, by changing the amplitude of the periodic variation of the wavelength;

d. measuring the double frequency term of the intensity, the coefficient of said double frequency term being related to the line width parameter of said spectral line; and e. measuring the single frequency term of the intensity, the coefficient of said single frequency term being related to the skewness parameter of said spectral line.

16. The method of claim 15 wherein said periodic variation is sinusoidal.

17. A method of determining the elemental composition of a luminescent material having an elemental composition related to peak luminescent intensity comprising the steps of:

a. scanning said material in at least one direction;

b. simultaneously measuring the intensity emitted from said material in a first wavelength of detection;

c. simultaneously varying the wavelength of detection at which the intensity is measured by a small amount about the first wavelength of detection while continuously measuring the intensity;

d. simultaneously measuring the derivative of the intensity with respect to wavelength $(dI/d\lambda)$;

e. simultaneously readjusting the first wavelength of detection such that $dI/d\lambda = 0$ continuously during the scan whereby said continuous measurement of intensity is locked on the peak intensity at all positions along the scan of the material; and f. substituting the measured peak intensity into the relationship of composition to peak intensity, whereby said atomic proportions are determined as a continuous function of position.

18. A method of determining the location of areas, on a luminescent material, the areas having characteristics different from other areas, wherein the characteristics are related to peak luminescent intensity comprising the steps of:

a. scanning said material in at least one direction;

b. simultaneously measuring the intensity emitted from said material at a first wavelength of detection;

c. simultaneously varying the wavelength of detection at which the intensity is measured by a small amount about the first wavelength of detection while continuously measuring the intensity;

d. simultaneously measuring the derivative of the intensity with respect to wavelength $(dI/\lambda)$;

e. simultaneously readjusting the first wavelength of detection such that $dI/d\lambda = 0$ continuously during the scan whereby said continuous measurement of intensity is locked on the peak intensity at all positions along the scan of the material; and f. producing an output showing changes in peak intensity as a function of position whereby said changes are indicative of the boundaries of said areas having different characteristics.

* * * * *